US012620708B2

(12) United States Patent
Sampo

(10) Patent No.: US 12,620,708 B2
(45) Date of Patent: May 5, 2026

(54) ANTENNA DEVICE

(71) Applicant: YOKOWO CO., LTD., Tokyo (JP)

(72) Inventor: Takeshi Sampo, Tomioka (JP)

(73) Assignee: YOKOWO CO., LTD., Tokyo (JP)

( * ) Notice: Subject to any disclaimer, the term of this patent is extended or adjusted under 35 U.S.C. 154(b) by 166 days.

(21) Appl. No.: 18/562,341

(22) PCT Filed: Jun. 15, 2022

(86) PCT No.: PCT/JP2022/024015
§ 371 (c)(1),
(2) Date: Nov. 20, 2023

(87) PCT Pub. No.: WO2023/276674
PCT Pub. Date: Jan. 5, 2023

(65) Prior Publication Data

US 2024/0243475 A1 Jul. 18, 2024

(30) Foreign Application Priority Data

Jun. 28, 2021 (JP) ................................ 2021-106724

(51) Int. Cl.
*H01Q 5/30* (2015.01)
*H01Q 1/48* (2006.01)

(52) U.S. Cl.
CPC ................ *H01Q 5/30* (2015.01); *H01Q 1/48* (2013.01)

(58) Field of Classification Search
None
See application file for complete search history.

(56) References Cited

U.S. PATENT DOCUMENTS

2008/0238783 A1* 10/2008 Wong ...................... H01Q 1/36
343/700 MS

FOREIGN PATENT DOCUMENTS

JP 2006-033699 A 2/2006
JP 2011130280 A * 6/2011

OTHER PUBLICATIONS

International Search Report and Written Opinion mailed on Sep. 20, 2022, received for PCT Application PCT/JP2022/024015, filed on Jun. 15, 2022, 9 pages including English Translation.

* cited by examiner

*Primary Examiner* — Crystal L Hammond
(74) *Attorney, Agent, or Firm* — XSENSUS LLP

(57) ABSTRACT

An antenna device comprising: a ground part; and an antenna provided at an end portion of the ground part, the antenna including a feeding portion and a first element extending from the feeding portion, the antenna supporting at least a first frequency band, wherein the ground part includes an arm portion defined by an outer edge of the ground part and a slit having an open end located at the outer edge and a closed end located inside the ground part, and the feeding portion is provided at the arm portion.

11 Claims, 9 Drawing Sheets

ANTENNA DEVICE

CROSS-REFERENCE TO RELATED APPLICATIONS

The present application is based on PCT filing PCT/JP2022/024015, filed Jun. 15, 2022, which claims priority to Japanese Patent Application No. 2021-106724, filed Jun. 28, 2021, the entire contents of each are incorporated herein by reference.

TECHNICAL FIELD

The present disclosure relates to an antenna device.

BACKGROUND ART

PTL 1 discloses an antenna device including a telephone antenna element and an antenna element for GPS/VICS that are provided at the same ground.

CITATION LIST

Patent Literature

[PTL 1] Japanese Patent Application Publication No. 2006-33699

SUMMARY OF INVENTION

Technical Problem

For example, it may be difficult to ensure the length of an antenna element supporting radio waves in a low frequency band when reducing the size of an antenna device.

The present disclosure is directed, for example, to easy achievement of an antenna supporting radio waves in a low frequency band. Others that the present disclosure is directed to will become apparent from the description of the present specification.

An aspect of the present disclosure is an antenna device comprising: a ground part; and an antenna provided at an end portion of the ground part, the antenna including a feeding portion and a first element extending from the feeding portion, the antenna supporting at least a first frequency band, wherein the ground part includes an arm portion defined by an outer edge of the ground part and a slit having an open end located at the outer edge and a closed end located inside the ground part, and the feeding portion is provided at the arm portion.

According to The above-described aspect of the present disclosure, it is possible to easily achieve an antenna supporting radio waves in a low frequency band.

DESCRIPTION OF EMBODIMENTS

Figure 1:
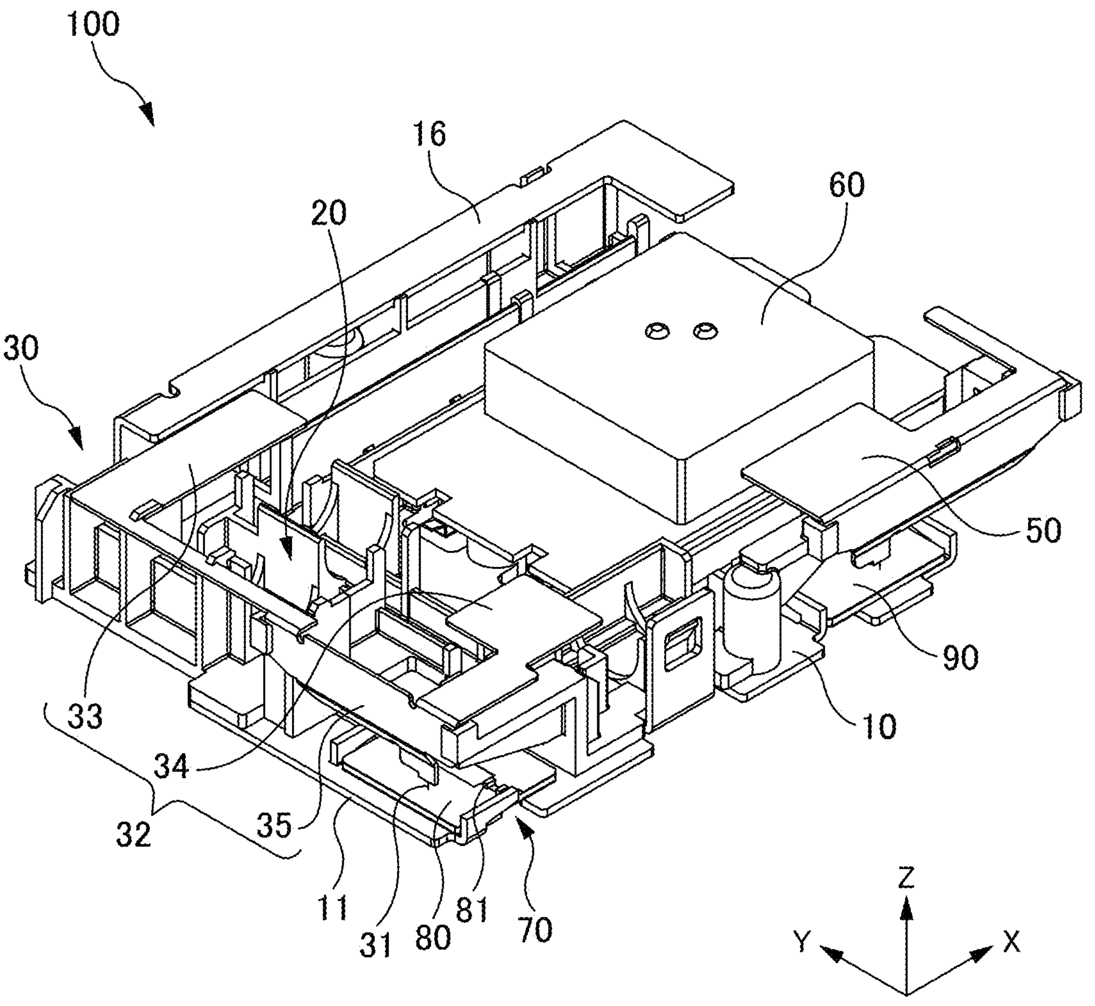
FIG. 1 is a perspective view of an antenna device 100.

At least following matters will become apparent from the descriptions of the present specification and the accompanying drawings.

Preferred embodiments of the present disclosure will be described below with reference to the drawings. The same or equivalent constituent elements, members, and the like illustrated in the drawings are given the same reference signs, and repetitive description thereof is omitted for convenience.

==Antenna Device 100==

<<Overview>>

First, an overview of the configuration of an antenna device 100 will be described with reference to FIGS. 1 to 4.

Figure 2:
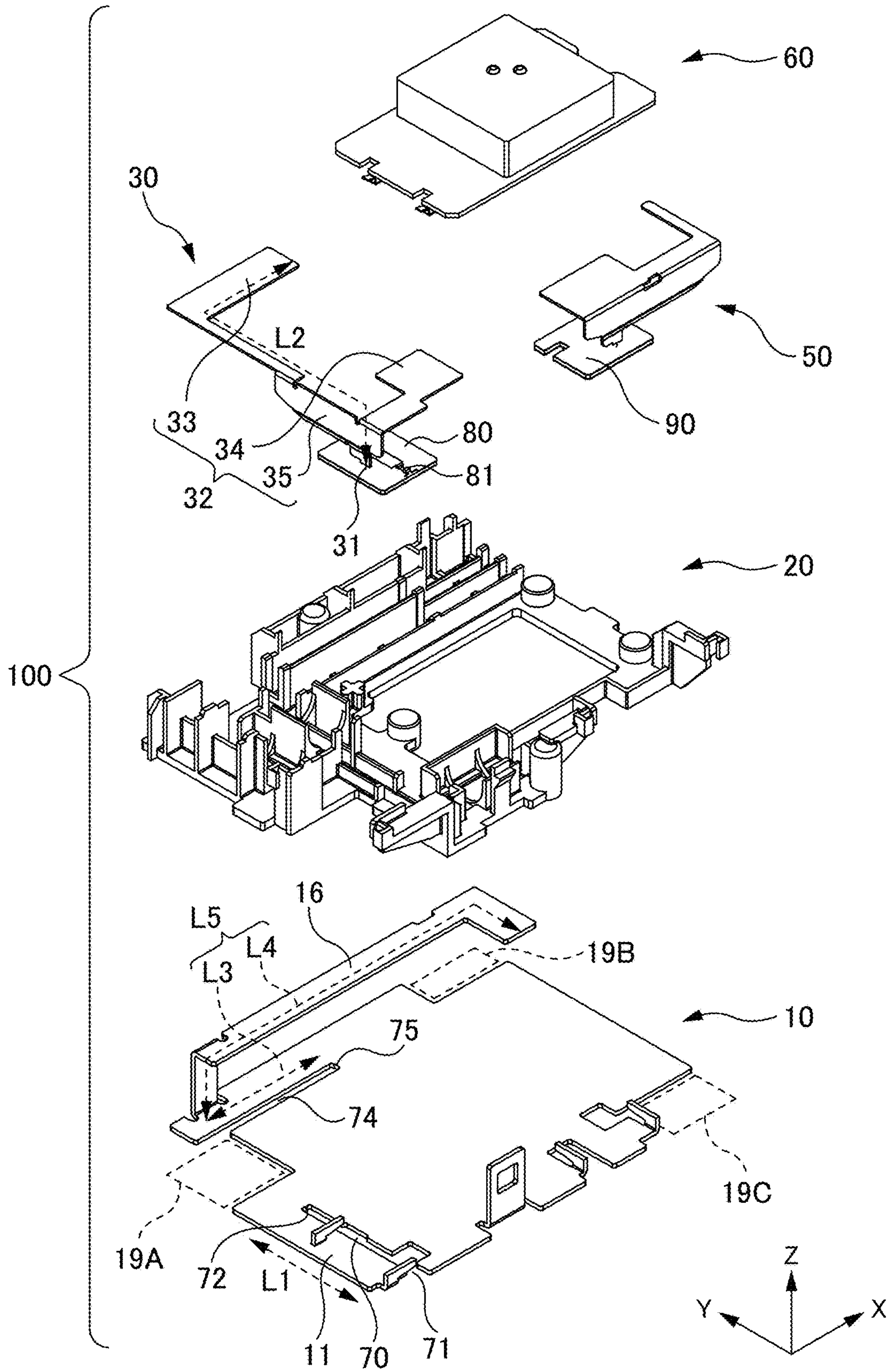
FIG. 2 is an exploded perspective view of an antenna device 100.
Figure 3:
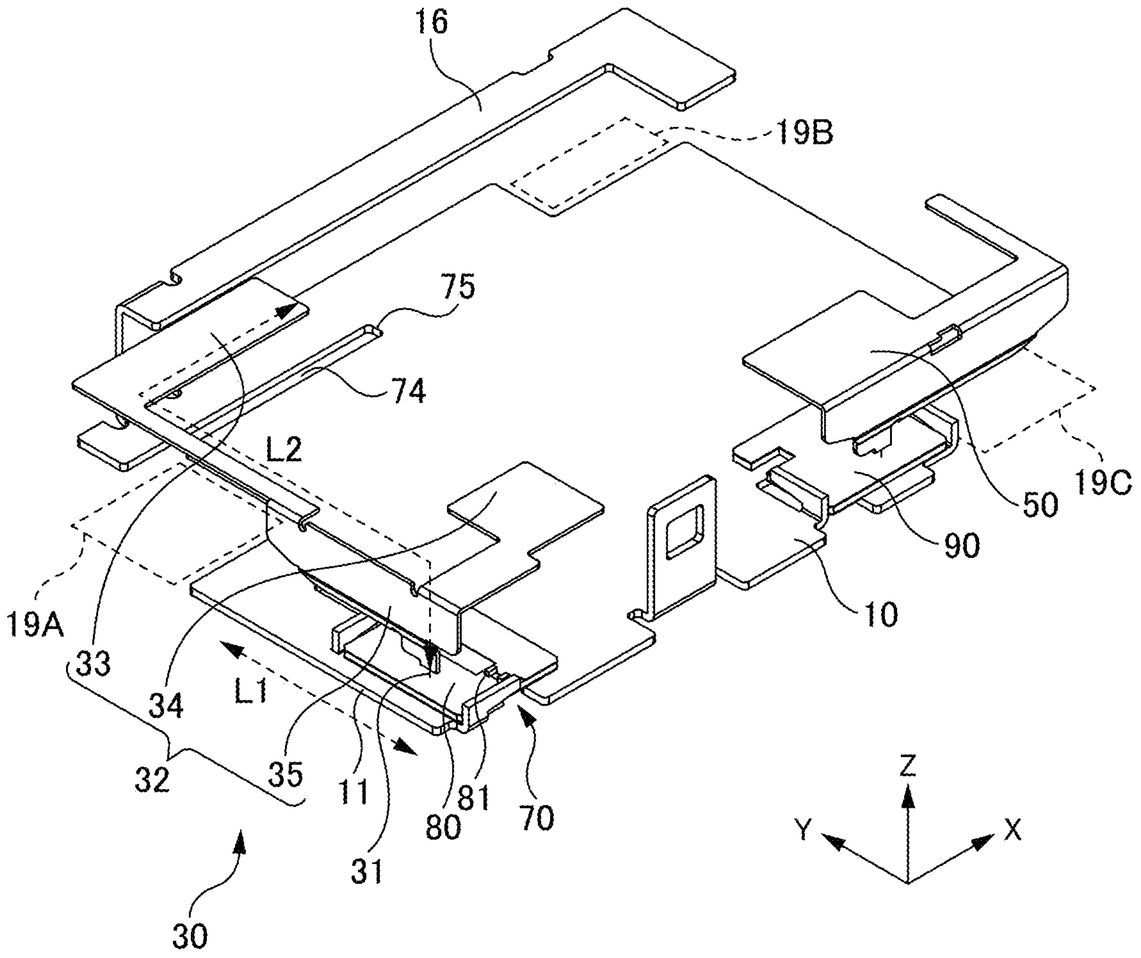
FIG. 3 is a perspective view illustrating an antenna device 100 from which a holder 20 and a patch antenna 60 are omitted.
Figure 4:
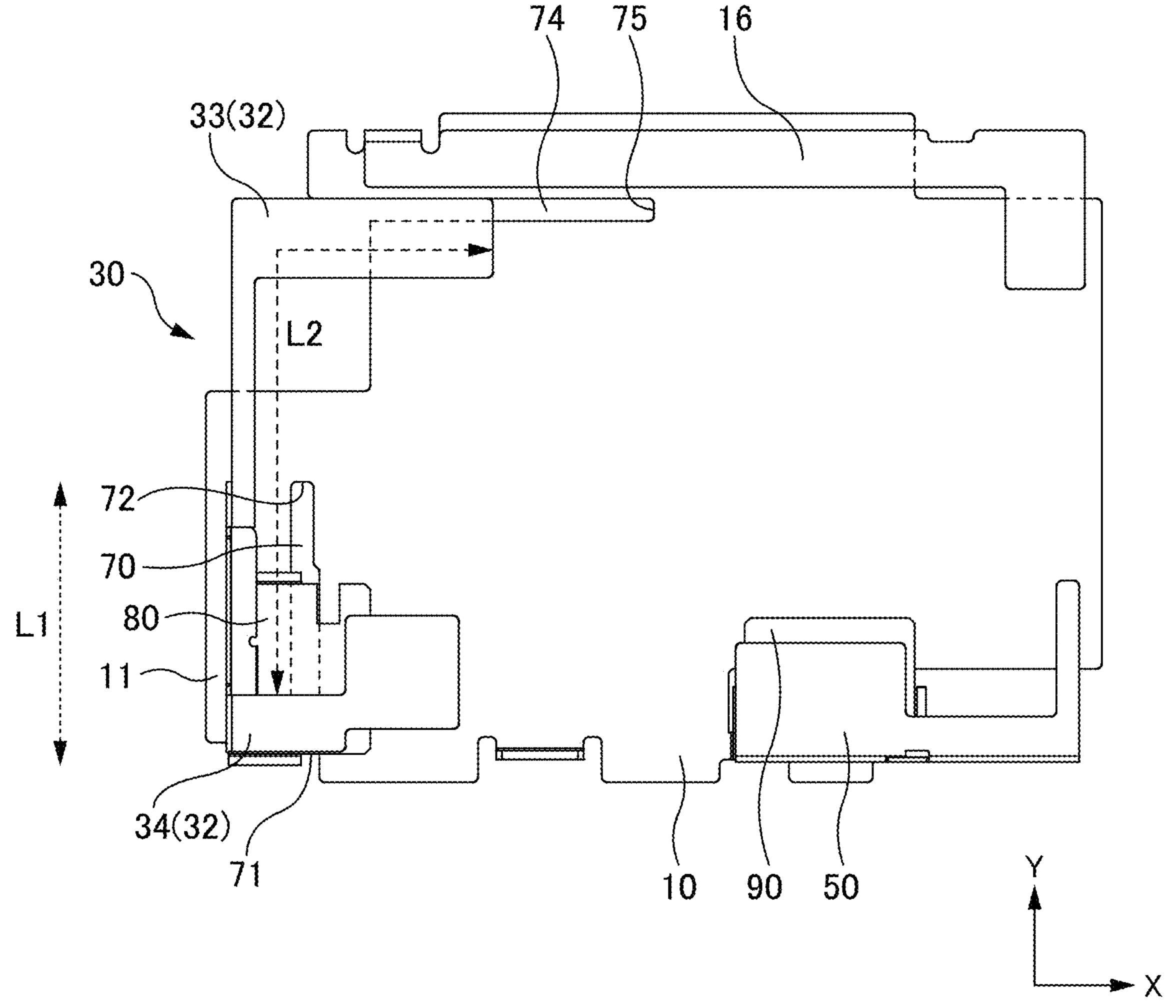
FIG. 4 is a plan view illustrating an antenna device 100 from which a holder 20 and a patch antenna 60 are omitted.

FIG. 1 is a perspective view of the antenna device 100. FIG. 2 is an exploded perspective view of the antenna device 100. FIG. 3 is a perspective view illustrating the antenna device 100 from which a holder 20 and a patch antenna 60 are omitted. FIG. 4 is a plan view illustrating the antenna device 100 from which the holder 20 and the patch antenna 60 are omitted. Note that, in FIGS. 3 and 4, the holder 20 and the patch antenna 60 are omitted from the antenna device 100, in order to briefly illustrate a ground part 10, a TEL antenna 30 (a first antenna), and a TEL antenna 50 (a second antenna) (both will be described later) constituting part of the components of the antenna device 100.

In FIG. 1, an X-direction is the direction in which the TEL antenna 30 and the patch antenna 60 are arranged. Further, a +X-direction is the direction from the TEL antenna 30 toward the patch antenna 60, and a −X-direction is the direction opposite thereto (from the patch antenna 60 toward the TEL antenna 30).

Further, in FIG. 1, a Y-direction is the direction in which the TEL antenna 50 and the patch antenna 60 are arranged. Further, a +Y-direction is the direction from the TEL antenna 50 toward the patch antenna 60, and a −Y-direction is the direction opposite thereto (from the patch antenna 60 toward the TEL antenna 50).

Further, in FIG. 1, a Z-direction is the direction perpendicular to the X-direction and the Y-direction. Further, a +Z-direction is the direction from the ground part 10 toward the patch antenna 60, and a −Z-direction is the direction opposite thereto (from the patch antenna 60 toward the ground part 10).

The antenna device 100 is a vehicular antenna device to be used at a vehicle (not illustrated). In an embodiment of the present disclosure, the antenna device 100 is housed in a casing (not illustrated) and is mounted, for example, at the roof or an inside of an instrument panel of the vehicle.

However, the antenna device 100 may be mounted at a location of the vehicle other than the roof or the inside of the instrument panel. Further, the antenna device 100 may be an antenna device other than a vehicular one.

The antenna device 100 includes the ground part 10, the holder 20, the TEL antenna 30, the TEL antenna 50, and the patch antenna 60.

The ground part 10 is a member functioning as a ground for the antennas included in the antenna device 100. In an embodiment of the present disclosure, the ground part 10 functions as a ground that is common to the TEL antenna 30, the TEL antenna 50, and the patch antenna 60. However, the ground part 10 may function as a ground common to part of the antennas included in the antenna device 100. For example, the ground part 10 may function as a ground common to the TEL antenna 30 and the TEL antenna 50, and another ground part may function as a ground for the patch antenna 60.

Further, as illustrated in FIGS. 1 and 2, the ground part 10 of an embodiment of the present disclosure is formed as an integral metal plate (sheet metal) at which the TEL antenna 30, the TEL antenna 50, and the patch antenna 60 are to be provided. Further, a slit 70, which will be described later, is formed in the ground part 10. However, the ground part 10 may be configured with a plurality of separate metal plates. For example, the ground part 10 may be configured such that a metal plate provided with the TEL antenna 30 and the TEL antenna 50 and another metal plate provided with the patch antenna 60 are electrically coupled.

Note that the ground part 10 may be formed of a member having a shape other than a plate shape, as long as the member functions as a ground for the antennas included in the antenna device 100. Further, the ground part 10 may be configured such that a metallic member and a non-metallic member are freely combined, as long as the ground part 10 functions as a ground for the antennas included in the antenna device 100. For example, the ground part 10 may include a metal plate and an insulator made of resin. Further, the ground part 10 may be configured with a single substrate formed such that a conductive pattern is formed at a printed board (PCB: Printed-Circuit Board).

Further, in an embodiment of the present disclosure, as illustrated in FIGS. 3 and 4, a substrate 80 (a first substrate) to which the TEL antenna 30 is to be coupled and a substrate 90 (a second substrate) to which the TEL antenna 50 is to be coupled are provided at the ground part 10 formed of a metal plate. Note that the substrate 80 and the substrate 90 are printed boards having conductive patterns formed at the surfaces of the printed boards.

Further, as illustrated in FIG. 4, the ground part 10 is formed in a substantially quadrate shape in a plan view when seen in the Z-direction. In the following description, the term "substantially quadrate shape" refers to a shape formed of four sides including, for example, a square and a rectangle, and, for example, at least one of the corners thereof may be cut off obliquely relative to a side thereof, or have a curve.

The above-described "substantially quadrate shape" may include a cutout (recess) or a projection (protrusion) in part of the sides. As illustrated in, for example, FIGS. 2 and 3, in the ground part 10 of an embodiment of the present disclosure, the body portion of the ground part 10 is cut out to thereby form cutout portions 19A to 19C. Further, the ground part 10 of an embodiment of the present disclosure includes, for example, a ground-side element 16 projecting from the body portion of the ground part 10. Further, for example, the ground part 10 may have a polygonal shape other than the substantially quadrate shape or have a circular or oval shape.

Note that the details of the configuration of the ground part 10 including the cutout portions 19A to 19C and the ground-side element 16 described above will be described later.

As illustrated in FIGS. 1 and 2, the holder 20 is a member to hold the TEL antenna 30, the TEL antenna 50, and the patch antenna 60, and is provided at the ground part 10. Further, the holder 20 is formed of, for example, resin. However, the holder 20 may be formed of a material other than resin, as long as the holder 20 can hold the TEL antenna 30, the TEL antenna 50, and the patch antenna 60. Further, the holder 20 may hold another member in addition to the TEL antenna 30, the TEL antenna 50, and the patch antenna 60. Note that the antenna device 100 does not have to have the holder 20 if the TEL antenna 30, the TEL antenna 50, and the patch antenna 60 are held in a casing (not illustrated).

The TEL antenna 30 is a monopole-antenna-based wide-band antenna for mobile communications. The TEL antenna 30 of an embodiment of the present disclosure supports radio waves in bands from 614 MHz to 5100 MHz (5.1 GHz) for GSM, UMTS, LTE, and 5G, for example. However, the TEL antenna 30 is not limited thereto, and may support radio waves in frequency bands for part (e.g., only 5G) of GSM, UMTS, LTE, and 5G. Further, the TEL antenna 30 may support radio waves in a frequency band for telematics or may support radio waves in frequency bands other than GSM, UMTS, LTE, and 5G. Note that the TEL antenna 30 may be referred to simply as "antenna" in the following description.

In the following description, in the frequency bands of radio waves supported by the TEL antenna 30 or the TEL antenna 50 which will be described later, a predetermined frequency band on the lower side may be referred to as "low frequency band." In an embodiment of the present disclosure, the low frequency band is a band from 614 MHz to 960 MHz, for example. Further, predetermined frequency bands on the side higher than the low frequency band may be referred to as "intermediate and high frequency bands." In an embodiment of the present disclosure, the intermediate and high frequency bands refer to both of a band from 1710 MHz to 2690 MHz (intermediate frequency band) and a band from 3300 MHz to 5100 MHz (high frequency band), for example. However, examples of the "low frequency band" and the "intermediate and high frequency bands" are not limited thereto, and may be different according to the frequency bands of radio waves supported by the TEL antenna 30 or the TEL antenna 50. Note that, in the following description, the low frequency band may be referred to as "first frequency band," and the intermediate and high frequency bands may be referred to as "second frequency band".

As illustrated in FIGS. 1 to 4, the TEL antenna 30 is provided at an end portion of the ground part 10. Specifically, the TEL antenna 30 is provided at an end portion of the ground part 10 on the −X-direction side. However, the position in the ground part 10 at which the TEL antenna 30 is provided is not limited to the end portion of the ground part 10 on the −X-direction side as long as it is an end portion of the ground part 10, but may be an end portion thereof on the +X-direction side, for example.

In an embodiment of the present disclosure, the TEL antenna 30 is formed of an integral metal plate (sheet metal). However, the TEL antenna 30 does not have to be formed of an integral metal plate, but may be configured such that a metal member and a non-metal member are combined or a plurality of metal members are physically or electrically coupled, for example. Further, the TEL antenna 30 may be formed of a conductive pattern provided at a printed board.

As illustrated in FIGS. 1 to 3, the TEL antenna 30 includes a feeding portion 31 and a first element 32 extending from the feeding portion 31 in the +Z-direction.

The feeding portion 31 is a region including a feeding point of the TEL antenna 30. In an embodiment of the present disclosure, the feeding portion 31 is located at the ground part 10 (specifically an arm portion 11 described later).

The first element 32 is an element used in the frequency band of radio waves supported by the TEL antenna 30. As illustrated in FIGS. 1 to 3, the first element 32 has a first portion 33, a second portion 34, and a third portion 35.

The first portion 33 is a portion (element) used in the low frequency band in the frequency bands of radio waves supported by the TEL antenna 30. Thus, the first portion 33 is formed to have a length and a width according to the used wavelength in the low frequency band (e.g., a wavelength at 699 MHz). In an embodiment of the present disclosure, as illustrated in FIGS. 1 to 3, the first portion 33 extends in such a manner as to face the ground part 10. Note that the direction in which the first portion 33 extends is not limited to that parallel to or substantially parallel to the ground part 10, but may be inclined relative to the ground part 10 at a predetermined angle. Further, the first portion 33 may be provided in such a manner as to extend in the +Z-direction relative to the ground part 10.

The second portion 34 is a portion (element) used in the intermediate and high frequency bands in the frequency bands of radio waves supported by the TEL antenna 30. In an embodiment of the present disclosure, the second portion 34 is used in a frequency band corresponding to harmonic components of the frequencies supported by the first portion 33 (e.g., around 2 GHz). Thus, the second portion 34 is formed to have a length and a width according to the used wavelength in the frequency band corresponding to harmonic components of the frequencies supported by the first portion 33. With the first element 32 including the second portion 34, it is possible to expand the bandwidth of the frequency bands (particularly, the intermediate and high frequency bands) of radio waves supported by the TEL antenna 30.

Further, in an embodiment of the present disclosure, as illustrated in FIGS. 1 to 3, the second portion 34 extends in such a manner as to face the ground part 10. Note that the direction in which the second portion 34 extends is not limited to that parallel to or substantially parallel to the ground part 10, but may be inclined relative to the ground part 10 at a predetermined angle. Further, the second portion 34 may be provided in such manner as to extend in the +Z-direction relative to the ground part 10.

The third portion 35 is a portion (element) used at least in the intermediate and high frequency bands in the frequency bands of radio waves supported by the TEL antenna 30. In an embodiment of the present disclosure, the third portion 35 is provided to improve the characteristics of the TEL antenna 30 particularly in the high frequency band (e.g., around 5 GHz) in the intermediate and high frequency bands. Thus, the third portion 35 is formed to have a length and a width according to the used wavelength particularly in the high frequency band in the intermediate and high frequency bands.

Further, in an embodiment of the present disclosure, as illustrated in FIGS. 1 to 3, the third portion 35 extends toward the ground part 10. In other words, the third portion 35 is a portion, of the TEL antenna 30, provided in such a manner as to extend in the Z-direction. Then, the first portion 33 and the second portion 34 each extend in such a manner as to extend in the X-direction from the third portion 35. Note that the direction in which the third portion 35 extends is not limited to a direction perpendicular to the ground part 10, but may be inclined relative to the ground part 10 at a predetermined angle. Further, the third portion 35 may extend in such a manner as to face the ground part 10. Similarly, the first portion 33 and the second portion 34 may extend from the third portion 35 in such a manner as to face the ground part 10, extend in a direction in which the third portion 35 extends as it is, or extend in such a manner as to be inclined relative to the ground part 10 at a predetermined angle.

In an embodiment of the present disclosure, the first element 32 of the TEL antenna 30 includes the first portion 33, the second portion 34, and the third portion 35, and thus the lengths of the elements of the TEL antenna 30 are different from one another. This enables the TEL antenna 30 to support frequency bands different from one another. Thus, the TEL antenna 30 can support radio waves in wide frequency bands. Specifically, the TEL antenna 30 can support radio waves in a wide-band frequency band including the low frequency band and the intermediate and high frequency bands. Accordingly, as with the TEL antenna 30 of an embodiment of the present disclosure, an antenna supporting radio waves in wide-band frequency bands, for example, by virtue of an element including the first portion 33, the second portion 34, and the third portion 35 may be referred to as "monopole-antenna-based wide-band antenna."

As described above, the TEL antenna 30 is formed of an integral metal plate (sheet metal). Specifically, as illustrated in FIGS. 1 to 3, the TEL antenna 30 is formed of an integral metal plate having a shape of the third portion 35, and the first and second portions 33 and 34 formed by bending the plate from the third portion 35. However, the TEL antenna 30 may be such that, for example, the first portion 33, the second portion 34, and the third portion 35 are configured with separate metal members, respectively, and electrically coupled.

Note that the shape of the first element 32 is not limited to the one illustrated in FIGS. 1 to 4. For example, the first element 32 may be configured with the first portion 33 and the second portion 34, without including the third portion 35. Further, the first element 32 does not have to have such a shape that the first portion 33 and the second portion 34 branch off from the third portion 35. For example, the first element 32 may have such a shape that the first portion 33, the second portion 34, and the third portion 35 branch off (extend) from different portions of the first element 32, respectively. Further, the first element 32 may be formed without branching, and the first element 32 may be formed of only the first portion 33, for example.

In an embodiment of the present disclosure, the TEL antenna 30 is configured such that the first portion 33 and the second portion 34 extend from the third portion 35 in such a manner as to be substantially parallel to the ground part 10. Accordingly, the TEL antenna 30 achieves not only widening the bands by virtue of including the first portion 33, the second portion 34, and the third portion 35, but also reducing the height of the antenna device 10 since the first portion 33 and the second portion 34 are formed in such a manner as to be substantially parallel to the ground part 10.

The TEL antenna 50 is, similarly to the TEL antenna 30 described above, a monopole-antenna-based wide-band antenna for mobile communications. The TEL antenna 50 of an embodiment of the present disclosure supports radio waves in bands from 1710 MHz to 5100 MHz (5.1 GHz) for GSM, UMTS, LTE, and 5G, for example. In other words, the TEL antenna 50 is an antenna supporting radio waves in the intermediate and high frequency bands. However, the TEL antenna 50 is not limited thereto, but may support radio waves in frequency bands for part (e.g., only 5G) of GSM, UMTS, LTE, and 5G. Further, the TEL antenna 50 may support radio waves in a frequency band for telematics or may support ratio waves in frequency bands other than GSM, UMTS, LTE, and 5G.

Note that the element of the TEL antenna 50 is formed to have a length and a width according to the used wavelength in the frequency band of radio waves supported thereby. Further, as illustrated in FIGS. 1 to 4, the TEL antenna 50 is provided at an end portion of the ground part 10. Specifically, the TEL antenna 50 is provided at an end portion of the ground part 10 on the −Y-direction side. However, the position in the ground part 10 at which the TEL antenna 50 is provided is not limited to the end portion of the ground part 10 on the −Y-direction side, as long as it is an end portion of the ground part 10, and may be an end portion on the +Y-direction side, for example. Further, the antenna device 100 does not have to have the TEL antenna 50.

Further, in an embodiment of the present disclosure, the element of the TEL antenna 50 includes a portion extending toward the ground part 10 (a portion provided in such a manner as to extend in the Z-direction) and a portion branching from the above portion and extending substantially parallel to the ground part 10 (a portion extending in the Y-direction), as in the TEL antenna 30 described above. Because the lengths of the elements of the TEL antenna 50 are different, the TEL antenna 50 can support different frequency bands. Accordingly, the TEL antenna 50 can support radio waves in wide frequency bands. Thus, as with the TEL antenna 30 of an embodiment of the present disclosure, the TEL antenna 50 also is a “monopole-antenna-based wide-band antenna.” As with the TEL antenna 30, the TEL antenna 50 also achieves not only widening the bands but also reducing the height of the antenna device 10.

In an embodiment of the present disclosure, the TEL antenna 50 is formed of an integral metal plate (sheet metal). However, the TEL antenna 50 does not have to be formed of an integral metal plate, but may be configured such that a metal member and a non-metal member are combined or a plurality of metal members are physically or electrically coupled. Further, the TEL antenna 50 may be formed of a conductive pattern provided at a printed board.

The patch antenna 60 is a planar antenna that supports radio waves of a Global Navigation Satellite System (GNSS), for example. In an embodiment of the present disclosure, the patch antenna 60 supports radio waves in the 1.5 GHz band for GNSS. Note that the communication standards and the frequency band supported by the patch antenna 60 are not limited to those described above, and may be other communication standards and frequency bands. Further, the patch antenna 60 may support radio waves in a plurality of frequency bands such as the L1 band, the L2 band, the L5 band, and the like, as long as it performs at least either transmission or reception of radio waves in a desired frequency band. Further, the antenna device 100 does not have to include the patch antenna 60.

<<Arm Portion 11 of Ground Part 10>>

As described above, the antenna device 100 of an embodiment of the present disclosure includes a plurality of antennas: the TEL antenna 30, the TEL antenna 50, and the patch antenna 60. For the antenna device 100 including a plurality of antennas as such, there may be demands for reducing the size of the entire antenna device 100 while ensuring isolation between the antennas. However, reducing the size of the antenna device 100 may make it difficult to ensure the lengths of the elements of the TEL antenna 30 and the TEL antenna 50, for example.

Further, the elements of the TEL antenna 30 and the TEL antenna 50 have lengths corresponding to the used wavelengths in the frequency bands of radio waves supported thereby, respectively. Because the TEL antenna 30 supports radio waves in the low frequency band as well, it may be particularly difficult to ensure the lengths of the elements of the TEL antenna 30.

Thus, the antenna device 100 of an embodiment of the present disclosure has the arm portion 11 formed in part of the ground part 10. The arm portion 11 is a portion that can be considered as a length of an element of the TEL antenna 30 in addition to the first element 32. In other words, in the antenna device 100 of an embodiment of the present disclosure, with the provision of the arm portion 11, the frequencies supported by the TEL antenna 30 can be further lowered (shifted to the lower frequency side) from the frequencies supported corresponding to the length of the first element, by an amount corresponding to the length of the arm portion 11, without increasing the length of the first element (L2 illustrated in FIGS. 2 to 4). This makes it possible to easily achieve an antenna that supports radio waves in the low frequency band. The following describes the characteristics of the arm portion 11 with reference again to FIGS. 1 to 4 and newly to FIGS. 5 and 6A.

Figure 5:
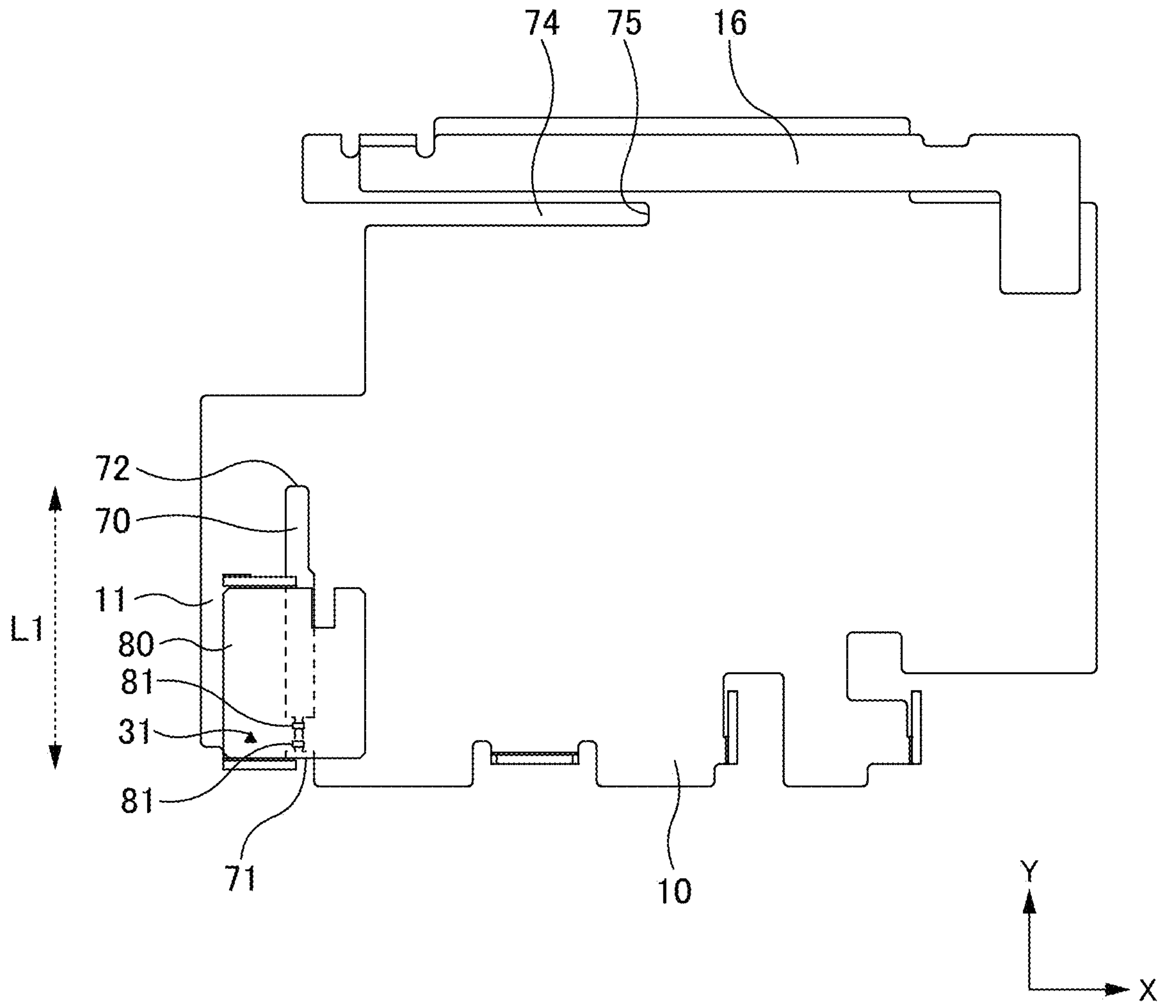
FIG. 5 is a plan view of a ground part 10 at which a substrate 80 is provided.
Figure 6A:
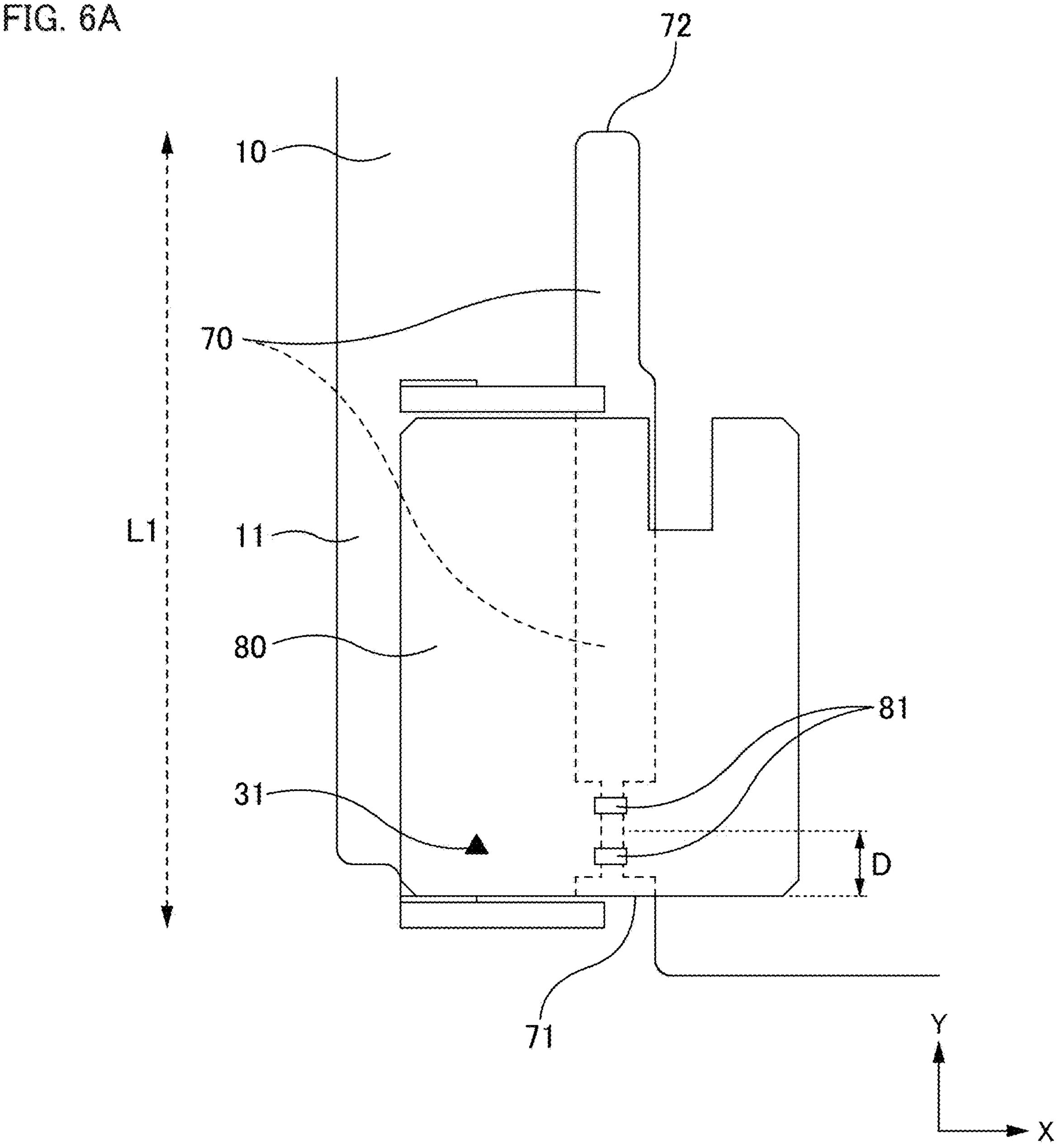
FIG. 6A is an enlarged plan view of a substrate 80 of a ground part 10 and the surroundings thereof.

FIG. 5 is a plan view of the ground part 10 at which the substrate 80 is provided. FIG. 6A is an enlarged plan view illustrating the substrate 80 at the ground part 10 and the surroundings thereof.

In an embodiment of the present disclosure, as illustrated in FIGS. 5 and 6A, the slit 70 is formed in the ground part 10. The slit 70 is a cut formed to provide the arm portion 11 at an end portion of the ground part 10. Note that when the ground part 10 is formed of a single substrate as described above, the slit 70 may also be an insulating portion provided on the substrate. In this case, the arm portion 11 is formed of a conductive pattern. In an embodiment of the present disclosure, as illustrated in FIGS. 5 and 6A, the slit 70 has an open end 71 at an outer edge of the ground part 10 and a closed end 72 inside the ground part 10. In other words, the open end 71 is located at the outer edge of the ground part 10, and the closed end 72 is located inside the ground part 10.

Further, in an embodiment of the present disclosure, with the slit 70 being formed in the ground part 10, the ground part 10 has, as illustrated in FIGS. 5 and 6A, the arm portion 11 defined by the outer edge of the ground part 10 and the slit 70. As described above, the TEL antenna 30 is located at the end portion of the ground part 10 on the −X-side. The arm portion 11 is provided also at the end portion of the ground part 10 on the −X-side where the TEL antenna 30 is located. Thus, the feeding portion 31 of the TEL antenna 30 is provided at the arm portion 11. Further, in an embodiment of the present disclosure, the feeding portion 31 is provided at a tip end portion of the arm portion 11, as illustrated in FIGS. 5 and 6A.

Herein, the "end portion" refers to such a region where the arm portion 11 and the first element 32 can operate as the TEL antenna 30 by virtue of the arm portion 11 being considered as the length of the TEL antenna 30 as will be described later.

With the feeding portion 31 of the TEL antenna 30 being provided at the arm portion 11 defined by the outer edge of the ground part 10 and the slit 70, the arm portion 11 can be considered as the length of the element of the TEL antenna 30 in addition to the first element 32. In other words, the total (L1+L2) of the length (L1) of the arm portion 11 and the length (L2) of the first element 32 illustrated in FIGS. 2 to 4 is the length of the antenna element used in the low frequency band. That is, it becomes easy to ensure the length of the element of the TEL antenna 30, thereby being able to easily achieve the TEL antenna 30 supporting radio waves in the low frequency band.

It is preferable in an embodiment of the present disclosure that the total (L1+L2) of the length (L1) of the arm portion 11 and the length (L2) of the first element 32 is substantially a quarter of the wavelength of the low frequency band. However, the total of the length of the arm portion 11 and the length of the first element 32 may be other than substantially a quarter of the wavelength of the low frequency band. Further, in an embodiment of the present disclosure, the length of the arm portion 11 (L1) is equal to or smaller than the length of the first element 32 (L2) (L1≤L2). However, the length of the arm portion 11 may be greater than the length of the first element 32.

Note that as given by the dashed arrow in FIGS. 2 to 4, the length of the first element 32 (L2) represents a distance from an end portion of the first portion 33 farthest from the second portion 34 to the feeding portion 31.

Figure 9A:
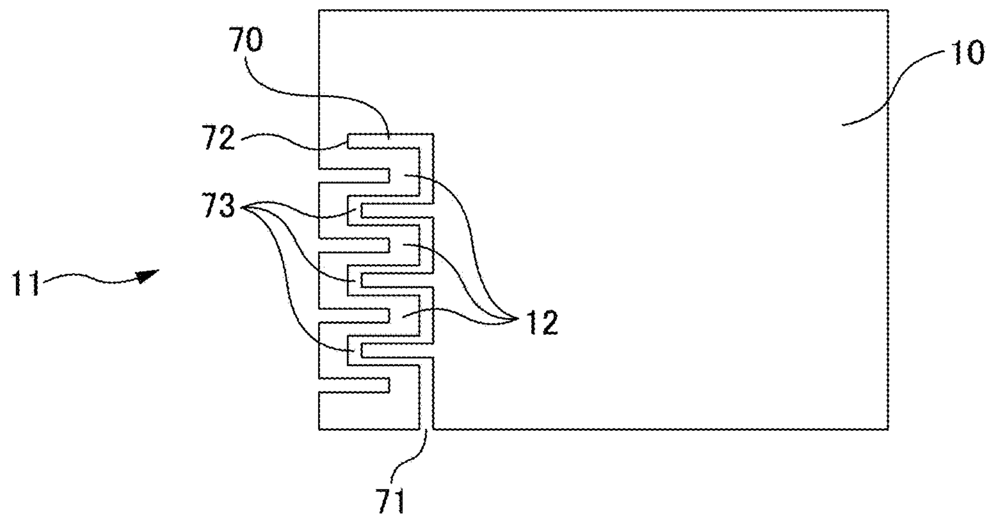
FIG. 9A is a diagram illustrating a first modification of an arm portion 11 and a slit 70 of a ground part 10.
Figure 9B:
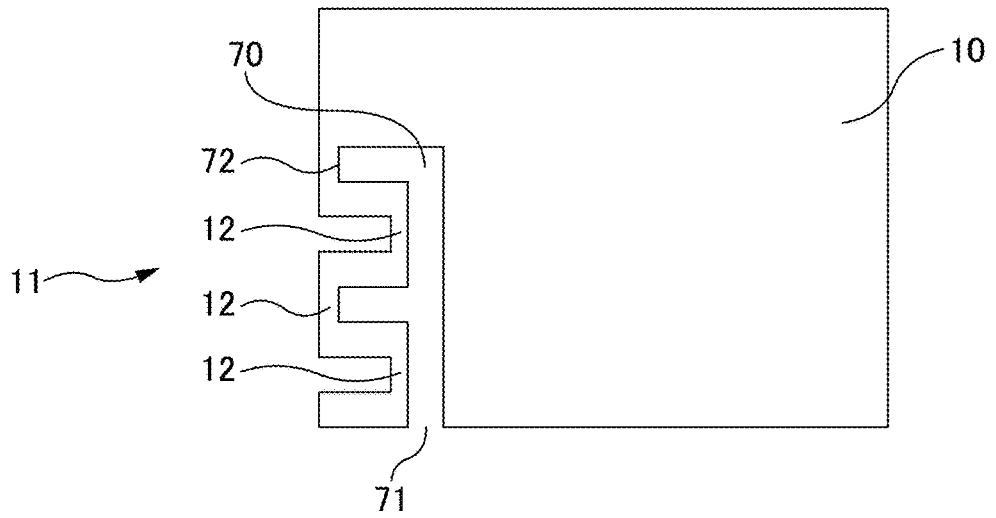
FIG. 9B is a diagram illustrating a second modification of an arm portion 11 and a slit 70 of a ground part 10.

Note that the arm portion 11 is provided in such a manner as to extend in the −Y-direction, as illustrated in FIGS. 5 and 6A. However, the arm portion 11 is not limited to the shape illustrated in FIGS. 5 and 6A, as long as it is provided at an end portion of the ground part 10. For example, the arm portion 11 may have a meandering shape, as illustrated in FIGS. 9A and 9B which will be described later.

<<Filter 81>>

With the slit 70 being formed in the ground part 10, the characteristics of the TEL antenna 30 in the intermediate and high frequency bands may be degraded. Thus, in the antenna device 100 of an embodiment of the present disclosure, a filter 81 is provided in such a manner as to extend across the slit 70. The following describes the characteristics of the filter 81 with reference to FIGS. 5 and 6B.

The filter 81 is a circuit element that allows signals in the intermediate and high frequency bands to pass therethrough and blocks signals in the low frequency band from passing therethrough, and includes a capacitor C and an inductor L, for example. In an embodiment of the present disclosure, the filter 81 is a band elimination filter (also referred to as a band elimination filter). The band elimination filter of an embodiment of the present disclosure is a circuit element that blocks signals in a predetermined frequency band from passing therethrough, but, for example, a surface acoustic wave (SAW) filter may also be used.

Figure 6B:
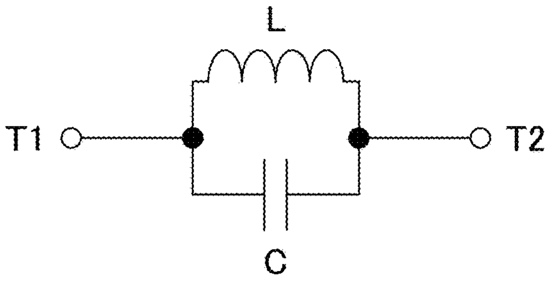
FIG. 6B is an explanatory diagram illustrating a filter 81 as a band elimination filter.

FIG. 6B is an explanatory diagram illustrating the filter 81 serving as a band elimination filter.

As illustrated in FIG. 6B, the filter 81 serving as a band elimination filter includes the capacitor C and the inductor L, to configure a parallel resonant circuit. The filter 81 has one terminal T1 coupled to the ground part 10 at one side of the slit 70, and the other terminal T2 is coupled to the ground part 10 at the other side of the slit 70. In this way, the filter 81 is provided so as to extend across the slit 70.

With the use of a band elimination filter as the filter 81 extending across the slit 70, it is possible to allow signals in the intermediate and high frequency bands to pass through the slit 70 and block signals in the low frequency band from passing through the slit 70. In other words, the slit 70 apparently does not exist in terms of signals in the intermediate and high frequency bands. This makes it possible to suppress the degradation of the characteristics of the TEL antenna 30 in the intermediate and high frequency bands caused by the slit 70. However, in the antenna device 100, the filter 81 does not have to be provided at the slit 70.

Note that in terms of blocking signals in the low frequency band from passing therethrough and allowing signals in the intermediate and high frequency bands to pass therethrough, a bandpass filter can be used as the filter 81. A bandpass filter is a circuit element that allows signals in a predetermined frequency band to pass therethrough. Accordingly, with the use of a bandpass filter that allows signals in the intermediate and high frequency bands to pass therethrough as the filter 81 extending across the slit 70 as well, it is possible to allows signals in the intermediate and high frequency bands to pass through the slit 70 and block signals in the low frequency band from passing through the slit 70.

However, in a case where the filter 81 is provided in such a manner as to extend across the slit 70, it is preferable to use a band elimination filter that is capable of coupling the parallel resonant circuit including the capacitor C and the inductor L to the ground part 10 at two sides of the slit 70.

Note that, in an embodiment of the present disclosure, as illustrated in FIG. 6A, a distance D between the open end 71 and the filter 81 is within substantially one eighths of the used wavelength in the intermediate and high frequency bands. However, the distance D between the open end 71 and the filter 81 may be greater than substantially one eighths of the used wavelength in the intermediate and high frequency bands.

Figure 7A:
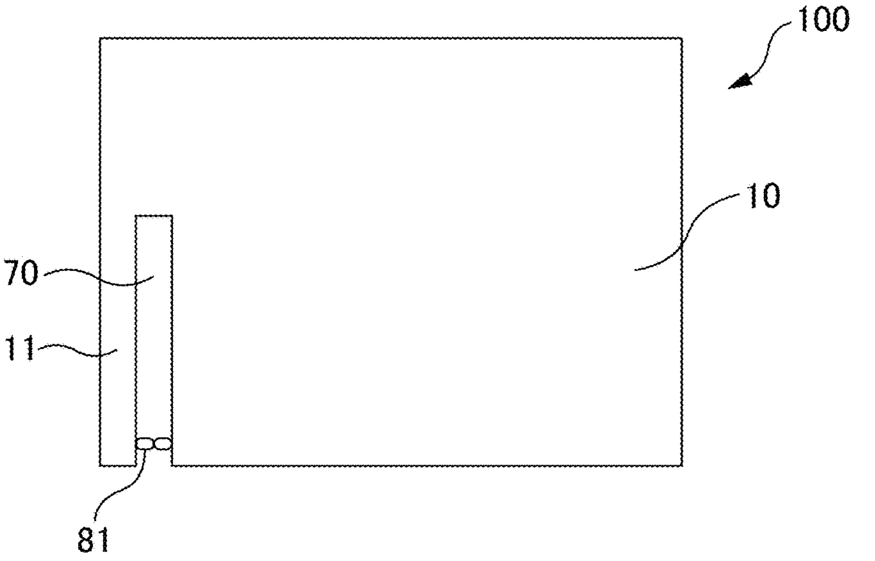
FIG. 7A is a diagram illustrating an antenna device 100.
Figure 7B:
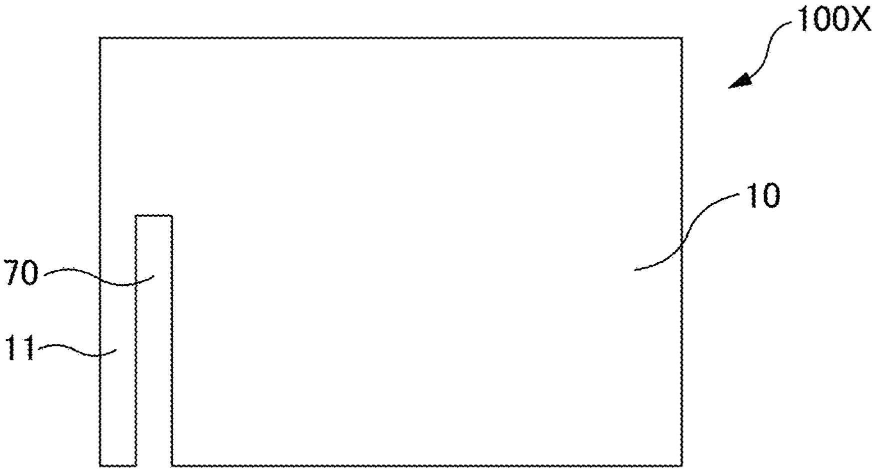
FIG. 7B is a diagram illustrating an antenna device 100X.
Figure 7C:
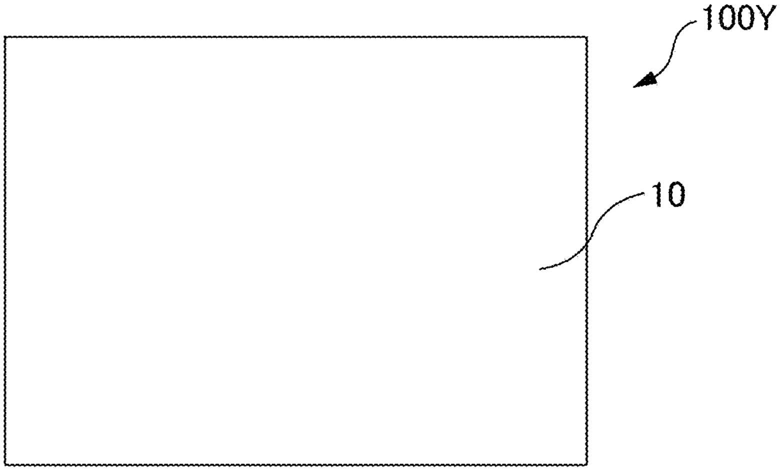
FIG. 7C is a diagram illustrating an antenna device 100Y.

FIGS. 7A to 7C are explanatory diagrams illustrating the antenna device 100, an antenna device 100X, and an antenna device 100Y. FIGS. 7A to 7C briefly illustrate the configurations of the antenna device 100, the antenna device 100X, and the antenna device 100Y to be tested, in terms of the presence and absence of the slit 70 (the arm portion 11) in the ground part 10, and the presence and absence of the filter 81 when the slit 70 is formed in the ground part 10.

FIG. 7A is a diagram explaining the antenna device 100. The antenna device 100 illustrated in FIG. 7A is the antenna device 100 of an embodiment of the present disclosure, and includes the arm portion 11, with the slit 70 being formed in the ground part 10, and the filter 81 is provided at the slit 70. Note that the slit 70, the arm portion 11, and the filter 81 are the same as those in the antenna device 100 of an embodiment of the present disclosure.

FIG. 7B is a diagram explaining the antenna device 100X. The antenna device 100X is an aspect in which the slit 70 the filter 81 is not provided, as compared to the antenna device 100, and other configuration is the same as that of the antenna device 100.

FIG. 7C is a diagram explaining the antenna device 100Y. The antenna device 100Y is an aspect in which neither the slit 70 (the arm portion 11) nor the filter 81 is provided, as compared to the antenna device 100, and other configuration is the same as the antenna device 100. The antenna device 100Y is also an aspect in which the slit 70 is not provided, as compared to the antenna device 100X, and other configuration is the same as that of the antenna device 100X.

Figure 8:
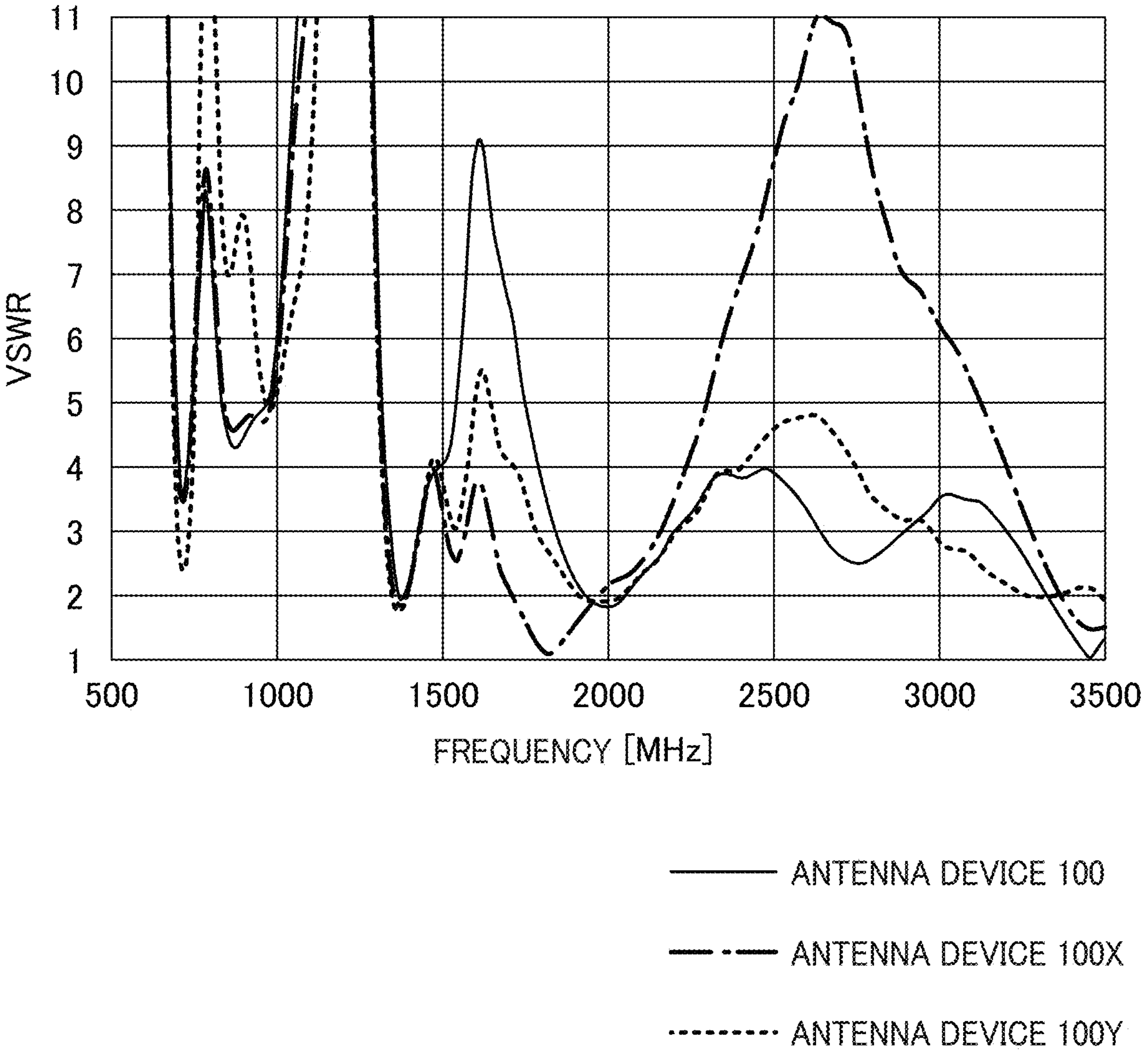
FIG. 8 is a graph illustrating an example of the frequency characteristics of an antenna device 100, an antenna device 100X, and an antenna device 100Y.

FIG. 8 is a graph illustrating an example of the frequency characteristics of the antenna device 100, the antenna device 100X, and the antenna device 100Y. In FIG. 8, the horizontal axis represents frequency, and the vertical axis represents voltage standing wave ratio (VSWR). Further, in FIG. 8, calculation results in the antenna device 100 are given by a solid line, calculation results in the antenna device 100X are given by a dot-dash line, and calculation results in the antenna device 100Y are given by a dotted line.

First, to verify the effects produced by the slit 70 (the arm portion 11), the calculation results in the antenna device 100X (the dot-dash line) and the calculation results in the antenna device 100Y (the dotted line) are compared. As illustrated in FIG. 8, when focusing on the low frequency band, particularly, the range from 700 MHz to 1000 MHz, the VSWR characteristics of the antenna device 100X (the dot-dash line) are greatly improved relative to the VSWR characteristics of the antenna device 100Y (the dotted line). In other words, it can be seen that the formation of the slit 70 (the arm portion 11) in the ground part 10 improves the characteristics of the TEL antenna 30 in the low frequency band. However, as illustrated in FIG. 8, when focusing on the intermediate and high frequency bands, particularly, the range from 2300 MHz to 3200 MHz, the VSWR characteristics of the antenna device 100X (the dot-dash line) are greatly degraded relative to the VSWR characteristics of the antenna device 100Y (the dotted line). In other words, it can be seen that the formation of the slit 70 in the ground part 10 degrades the characteristics of the TEL antenna 30 in the intermediate and high frequency bands.

Next, to verify the effects produced by the filter 81, the calculation results in the antenna device 100 (the solid line) and the calculation results in the antenna device 100X (the dot-dash line) are compared. As illustrated in FIG. 8, when focusing on the low frequency band, particularly, the range from 700 MHz to 1000 MHz, there is substantially no difference between the VSWR characteristics of the antenna device 100 (the solid line) and the VSWR characteristics of the antenna device 100X (the dot-dash line). In other words, it can be seen that the provision of the filter 81 at the slit 70 does not adversely affect the characteristics of the TEL antenna 30 in the low frequency band. Further, as illustrated in FIG. 8, when focusing on the intermediate and high frequency bands, particularly, the range from 2300 MHz to 3200 MHz in particular, the VSWR characteristics of the antenna device 100 (the solid line) are greatly improved relative to the VSWR characteristics of the antenna device 100X (the dot-dash line). In other words, it can be seen that the provision of the filter 81 at the slit 70 improves the characteristics of the TEL antenna 30 in the intermediate and high frequency bands.

From above, with the formation of the slit 70 (the arm portion 11) in the ground part 10, the antenna device 100 of an embodiment of the present disclosure can easily achieve the TEL antenna 30 supporting radio waves in the low frequency band, while suppressing the degradation of the characteristics of the TEL antenna 30 in the intermediate and high frequency bands caused by the slit 70.

<<Ground-Side Element 16>>

As described above, in an embodiment of the present disclosure, the first element 32 of the TEL antenna 30 has a length according to radio waves in the low frequency band. However, with the first element 32 alone, it may be difficult to ensure a bandwidth in the low frequency band.

Thus, in an embodiment of the present disclosure, the ground part 10 includes the ground-side element 16 formed in such a manner as to rise relative to the ground part 10. The ground-side element 16 is an element that is capacitively coupled with the first portion 33 of the first element 32. The ground-side element 16 is provided at a position at which a tip end of the first element 32 (the first portion 33) of the TEL antenna 30 is capacitively coupled therewith. Note that the ground-side element 16 is a parasitic element.

A predetermined frequency band supported by the ground-side element 16 is a band slightly lower than the low frequency band supported by the TEL antenna 30. A length L5 of the ground-side element 16 illustrated in FIG. 2 corresponds to the above-described predetermined frequency band. Note that a slit 74 is formed in the ground part 10, the slit 74 having a closed end 75 inside the ground part 10. The length L5 of the ground-side element 16 is the total of a length L3 of a region of the ground part 10 in which the slit 74 is formed and a length L4 of a portion rising relative to the ground part 10.

Further, as described above, the ground-side element 16 is capacitively coupled with the first portion 33 of the first element 32 (the TEL antenna 30). Accordingly, the frequency bands supported by the TEL antenna 30 can be a band obtained by superimposing the frequency band supported by the TEL antenna 30 alone and the frequency band supported by the ground-side element 16. This makes it possible to expand the bandwidth of the low frequency band supported by the TEL antenna 30. However, the predetermined frequency band supported by the ground-side element 16 may be a band slightly higher than the low frequency band supported by the TEL antenna 30. In the following description, the ground-side element 16 may be referred to as "second element."

In the antenna device 100 of an embodiment of the present disclosure, as illustrated in FIG. 2, the ground-side element 16 rises upright from an end portion of the ground part 10 on the −X-direction side and extends in the +X-direction in such a manner as to face the ground part 10. However, the shape of the ground-side element 16, such as the shape in its extending direction, is not limited thereto, but the ground-side element 16 may be inclined relative to the ground part 10 at a predetermined angle or may be provided so as to extend in the +Z-direction relative to the ground part 10. However, in such a case, the ground-side element 16 needs to be provided at a position at which the tip end of the first element 32 (the first portion 33) of the TEL antenna 30 is capacitively coupled therewith.

<<Cutout Portions 19A to 19C>>

As described earlier, the first element 32, which is an element of the TEL antenna 30, includes the first portion 33 facing the ground part 10. With the first portion 33 facing the ground part 10, particularly the tip end portion of the first portion 33 and the ground part 10 may be coupled, to thereby degrade the characteristics of the TEL antenna 30. Further, the same issue may apply to the relationship between the ground-side element 16 and the ground part 10, and the relationship between the element of the TEL antenna 50 and the ground part 10.

Thus, in an embodiment of the present disclosure, as illustrated in FIGS. 2 and 3, the cutout portions 19A to 19C are formed at the ground part 10. The cutout portions 19A to 19C are formed to suppress the degradation of the characteristics of the antenna caused by coupling between the ground part 10 and the elements of the antennas facing the ground part 10.

As illustrated in FIGS. 2 and 3, the cutout portion 19A is formed such that the ground part 10 has a region not overlapping with part of the first portion 33 of the first element 32 of the TEL antenna 30 when seen in the Z-direction (the direction perpendicular to the ground part 10). Forming the cutout portion 19A at the ground part 10 increases the distance from the first portion 33 to the ground part 10 longer. Accordingly, it is possible to improve the characteristics of the TEL antenna 30.

Further, the cutout portion 19B is formed such that the ground part 10 has a region not overlapping with part of the ground-side element 16 when seen in the Z-direction (the direction perpendicular to the ground part 10). Forming the cutout portion 19B at the ground part 10 increases the distance between a tip end portion of the ground-side element 16 and the ground part 10 other than the ground-side element 16 longer. Accordingly, it is possible to improve the characteristics of the TEL antenna 30 including the first element 32 capacitively coupled with the ground-side element 16.

Further, the cutout portion 19C is formed such that the ground part 10 has a region not overlapping with the elements of the TEL antenna 50 when seen in the Z-direction (the direction perpendicular to the ground part 10). Forming the cutout portion 19C at the ground part 10 increases the distance between the ground part 10 and the elements of the TEL antenna 50 longer. Accordingly, it is possible to improve the characteristics of the TEL antenna 50.

Note that the cutout portions 19A to 19C are not limited to the shapes illustrated in FIGS. 2 and 3. For example, each of the cutout portions 19A to 19C of an embodiment of the present disclosure may be formed such that the ground part 10 has a region not overlapping with the entire of the corresponding element of the corresponding antenna, instead of part of the corresponding element thereof. Further, the cutout portions 19A to 19C do not need to be voids, but other members, such as insulators, may be inserted into the cutout portions 19A to 19C, as long as they do not affect the characteristics of the elements of the antennas.

Further, the ground part 10 may have only part (e.g., only the cutout portion 19A) of the cutout portions 19A to 19C or none of the cutout portions 19A to 19C formed therein.

<<Modifications of the Arm Portion 11 and Slit 70>>

Figure 9C:
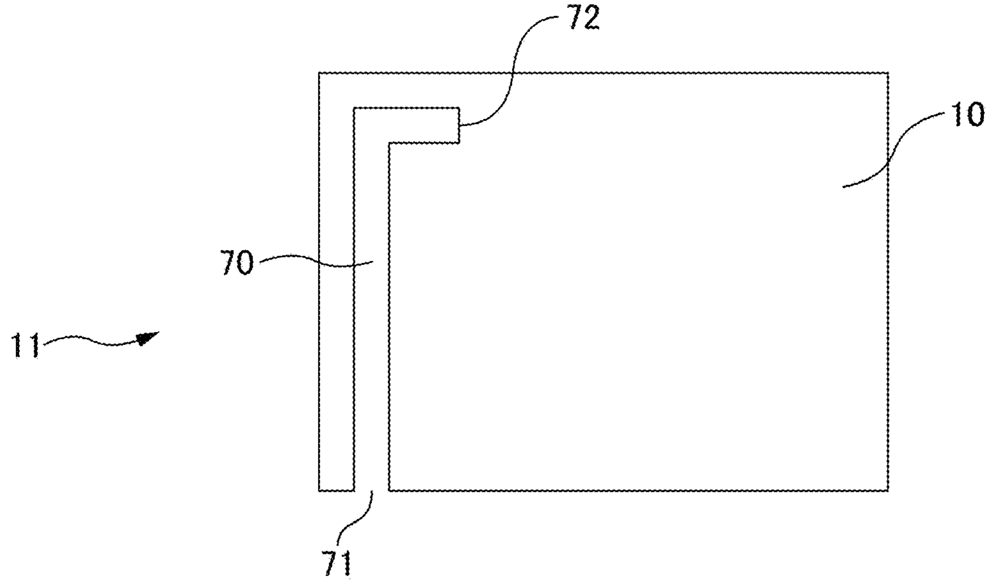
FIG. 9C is a diagram illustrating a third modification of an arm portion 11 and a slit 70 of a ground part 10.

FIGS. 9A to 9C are diagrams illustrating modifications of the arm portion 11 and the slit 70 of the ground part 10.

FIG. 9A is a diagram illustrating a first modification. In the first modification, the slit 70 and the arm portion 11 are in meandering shapes. Specifically, the slit 70 includes at least one turn 73 in a predetermined direction, and the arm portion 11 also includes at least one turn 12 in a predetermined direction. Accordingly, the length L1 of the arm portion 11 results in a length along the turn in the predetermined direction, thereby being able to lower the frequencies supported by the first element 32 of the TEL antenna 30. Thus, the first element 32 supporting the low frequency band can be easily achieved.

FIG. 9B is a diagram explaining a second modification. In the second modification, only the arm portion 11 includes at least one turn 12 in a predetermined direction as in the first modification, while the slit 70 has no turn. This can increase the length L1 of the arm portion 11 longer, thereby being able to lower the frequencies supported by the first element 32 of the TEL antenna 30. Thus, the first element 32 supporting the low frequency band can be easily achieved.

FIG. 9C is a diagram illustrating a third modification. In the third modification, the slit 70 is formed into an L shape, thereby being able to increase the length L1 of the arm portion 11 longer, and lower the frequencies supported by the first element 32 of the TEL antenna 30. Thus, the first element 32 supporting the low frequency band can be easily achieved.

==Summary==

The antenna device 100 of an embodiment of the present disclosure has been described above. For example, as illustrated in FIGS. 1 to 5, the antenna device 100 of an embodiment of the present disclosure includes the ground part 10 and the TEL antenna 30 (an antenna) provided at an end portion of the ground part 10, the TEL antenna 30 including the feeding portion 31 and the first element 32 extending from the feeding portion 31, the TEL antenna 30 supporting at least a first frequency band (e.g., 614 MHz to 960 MHz). Then, for example, as illustrated in FIGS. 5 and 6A, the antenna device 100 includes the arm portion 11 defined by an outer edge of the ground part 10 and the slit 70 having the open end 71 located at the outer edge and the closed end 72 located inside the ground part 10, and the feeding portion 31 is provided at the arm portion 11. According to the antenna device 100 of an embodiment of the present disclosure, an antenna element (the first element) supporting the low frequency band can be easily achieved.

Further, for example, as illustrated in FIGS. 1, 3, 5, and 6A, in the antenna device 100 of an embodiment of the present disclosure, the feeding portion 31 is provided at a tip end portion of the arm portion 11. This makes it possible to easily achieve the antenna element (the first element) supporting the low frequency band.

Further, in the antenna device 100 of an embodiment of the present disclosure, for example, as illustrated in FIGS. 2 to 4, the total (L1+L2) of the length (L1) of the arm portion 11 and the length (L2) of the first element 32 is substantially a quarter of the wavelength of the first frequency band (e.g., 614 MHz to 960 MHz). This makes it possible to easily achieve the antenna element (the first element) supporting the low frequency band.

Further, in the antenna device 100 of an embodiment of the present disclosure, for example, as illustrated in FIGS. 2 to 4, the length (L1) of the arm portion 11 is equal to or smaller than the length (L2) of the first element 32 (L1≤L2). This makes it possible to easily achieve the antenna element (the first element) supporting the low frequency band.

Further, in the antenna device 100 of an embodiment of the present disclosure, for example, as illustrated in FIGS. 9A and 9A, the arm portion 11 includes at least one turn 12 in a predetermined direction. This makes it possible to easily achieve the antenna element (the first element) supporting the low frequency band.

Further, in the antenna device 100 of an embodiment of the present disclosure, for example, as illustrated in FIGS. 1 to 3 and 5 to 7A, the first element 32 further supports a second frequency band higher than the first frequency band (e.g., 614 MHz to 960 MHz), and the antenna device 100 further includes the filter 81 extending across the slit 70, the filter 81 being configured to allow a signal in the second frequency band (e.g., 1710 MHz to 5100 MHz) to pass therethrough. This can suppress the degradation of the characteristics of the antenna element (the first element) in the intermediate and high frequency bands caused by the slit 70.

Further, in the antenna device 100 of an embodiment of the present disclosure, for example, as illustrated in FIG. 6A, the filter 81 is located within a distance of substantially one eighths of a wavelength of the second frequency band (e.g., 1710 MHz to 5100 MHz) from the open end 71. This can suppress the degradation of the characteristics of the antenna element (the first element) in the intermediate and high frequency bands caused by the slit 70.

Further, in the antenna device 100 of an embodiment of the present disclosure, for example, as illustrated in FIG. 6B, the filter 81 is a band elimination filter configured to block a signal in the first frequency band (e.g., 614 MHz to 960 MHz) from passing therethrough. This can suppress the degradation of the characteristics of the antenna element (the first element) in the intermediate and high frequency bands caused by the slit 70.

Further, in the antenna device 100 of an embodiment of the present disclosure, for example, as illustrated in FIG. 2 or 3, the first element 32 includes the first portion 33 and the second portion 34, the first portion 33 and the second portion 34 facing the ground part 10. This can expand the bandwidth of the frequency band supported by the antenna element (the first element).

Further, in the antenna device 100 of an embodiment of the present disclosure, for example, as illustrated in FIG. 2 or 3, the first element 32 includes the third portion 35 coupled to the feeding portion 31. This can expand the bandwidth of the frequency band supported by the antenna element (the first element).

Further, for example, as illustrated in FIGS. 1 to 5, the antenna device 100 of an embodiment of the present disclosure includes the ground-side element 16 (a second element) being part of the ground part 10, the ground-side element 16 being formed in such a manner as to rise relative to the ground part 10, and the ground-side element 16 is provided so as to be capacitively coupled with the first element 32. This can expand the bandwidth of the frequency band supported by the antenna element (the first element).

Further, in the antenna device 100 of an embodiment of the present disclosure, for example, as illustrated in FIGS. 2 and 3, the cutout portion 19A is formed at the ground part 10 such that the ground part 10 has a region not overlapping with at least part of the first element 32, in a plan view when seen in a direction perpendicular to the ground part 10. This can improve the characteristics of the antenna element (the first element).

The term “vehicular” used in an embodiment of the present disclosure means being mountable to a vehicle; thus, it is not limited to one attached to a vehicle, but also includes one that is brought into a vehicle and used inside the vehicle. Further, although the antenna device of an embodiment of the present disclosure is used for a “vehicle” that is a wheeled vehicle, the present disclosure is not limited thereto, but may be used for a mobile vehicle such as a flying vehicle such as a drone, a space probe, wheelless construction machinery, agricultural machinery, and a vessel, for example.

Embodiment(s) of the present disclosure described above is/are simply to facilitate understanding of the present disclosure and is/are not in any way to be construed as limiting the present disclosure. The present disclosure may variously be changed or altered without departing from its essential features and encompass equivalents thereof.

REFERENCE SIGNS LIST

10 ground part
11 arm portion
12 turn
16 ground-side element (second element)
19A to 19C cutout portion
20 holder
30 TEL antenna (antenna)
31 feeding portion
32 first element
33 first portion
34 second portion
35 third portion
50 TEL antenna
60 patch antenna
70, 74 slit
71 open end
72, 75 closed end
73 turn
80, 90 substrate
81 filter
100 antenna device

The invention claimed is:

1. An antenna device comprising:
a ground part; and
an antenna provided at an end portion of the ground part, the antenna including a feeding portion and a first element extending from the feeding portion, the antenna supporting at least a first frequency band, wherein
the ground part includes an arm portion defined by an outer edge of the ground part and a slit having an open end located at the outer edge and a closed end located inside the ground part,
the feeding portion is provided at the arm portion, and
the arm portion includes at least one turn in a predetermined direction.

2. The antenna device according to claim 1, wherein the feeding portion is provided at a tip end portion of the arm portion.

3. The antenna device according to claim 1, wherein a total of a length of the arm portion and a length of the first element is substantially a quarter of a wavelength of the first frequency band.

4. The antenna device according to claim 1, wherein a length of the arm portion is equal to or smaller than a length of the first element.

5. The antenna device according to claim 1, wherein the first element includes a third portion coupled with the feeding portion.

6. The antenna device according to claim 1, wherein a cutout portion is formed at the ground part such that the ground part has a region not overlapping with at least part of the first element in a plan view when seen in a direction perpendicular to the ground part.

7. An antenna device comprising:
a ground part; and
an antenna provided at an end portion of the ground part, the antenna including a feeding portion and a first element extending from the feeding portion, the antenna supporting at least a first frequency band, wherein
the ground part includes an arm portion defined by an outer edge of the ground part and a slit having an open end located at the outer edge and a closed end located inside the ground part,
the feeding portion is provided at the arm portion,
the first element further supports a second frequency band higher than the first frequency band, and
the antenna device further comprises a filter extending across the slit, the filter being configured to allow a signal in the second frequency band to pass therethrough.

8. The antenna device according to claim 7, wherein the filter is located at a position within a distance of substantially one eighths of a wavelength of the second frequency band from the open end.

9. The antenna device according to claim 7, wherein the filter is a band elimination filter configured to block a signal in the first frequency band from passing therethrough.

10. An antenna device comprising:

a ground part; and an antenna provided at an end portion of the ground part, the antenna including a feeding portion and a first element extending from the feeding portion, the antenna supporting at least a first frequency band, wherein the ground part includes an arm portion defined by an outer edge of the ground part and a slit having an open end located at the outer edge and a closed end located inside the ground part, the feeding portion is provided at the arm portion, and the first element includes a first portion and a second portion, the first portion and the second portion facing the ground part.

11. An antenna device comprising:

a ground part;

an antenna provided at an end portion of the ground part, the antenna including a feeding portion and a first element extending from the feeding portion, the antenna supporting at least a first frequency band;

a second element being part of the ground part, wherein the ground part includes an arm portion defined by an outer edge of the ground part and a slit having an open end located at the outer edge and a closed end located inside the ground part, the feeding portion is provided at the arm portion, the second element is formed in such a manner as to rise relative to the ground part, and the second element is provided so as to be capacitively coupled with the first element.

* * * * *